(12) United States Patent
Lehmen et al.

(10) Patent No.: US 9,139,194 B2
(45) Date of Patent: Sep. 22, 2015

(54) HYBRID POWERTRAIN INPUT TORQUE MANAGEMENT

(71) Applicant: GM GLOBAL TECHNOLOGY OPERATIONS LLC, Detroit, MI (US)

(72) Inventors: Allen J Lehmen, Howell, MI (US); Houchun Xia, Troy, MI (US); R. Anthony Hansen, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 13/737,336

(22) Filed: Jan. 9, 2013

(65) Prior Publication Data

US 2014/0195080 A1 Jul. 10, 2014

(51) Int. Cl.
*B60W 20/00* (2006.01)
*B60W 10/00* (2006.01)

(52) U.S. Cl.
CPC .............. *B60W 20/00* (2013.01); *B60W 10/00* (2013.01); *Y10T 477/23* (2015.01)

(58) Field of Classification Search
CPC ..... B60W 10/00; B60W 20/00; Y10T 477/23
See application file for complete search history.

(56) References Cited

U.S. PATENT DOCUMENTS 3,777,555 A * 12/1973 Petrisko et al. ................ 73/764
7,351,033 B2 * 4/2008 McNerney ........................ 416/1
2009/0112418 A1 4/2009 Buur et al.
2009/0118941 A1 * 5/2009 Heap ............................... 701/54
2011/0029208 A1 * 2/2011 Xia ................................. 701/58

FOREIGN PATENT DOCUMENTS

| DE | 4226010 A1 | 2/1994 |
| DE | 10321529 A1 | 12/2004 |
| DE | 102006030046 A1 | 1/2008 |
| EP | 0110865 A2 | 6/1984 |

* cited by examiner

*Primary Examiner* — John Q Nguyen
*Assistant Examiner* — Michael Kerrigan
(74) *Attorney, Agent, or Firm* — Quinn Law Group, PLLC

(57) ABSTRACT

A method for controlling a hybrid powertrain includes monitoring input torque of an input member and may include determining an oscillation torque. The method monitors critical vehicle characteristics, including at least a transmission operating mode and an input speed, and operates the powertrain at the input torque. The method compares input torque to a minimum threshold or oscillation torque to a fatigue threshold and identifies a first critical event, which occurs when input torque exceeds the minimum threshold or oscillation torque exceeds the fatigue threshold. The method identifies a first peak with the on-board controller during the first critical event. Peak events occur when the monitored input torque or oscillation torque changes between positive and negative slope. The method identifies a first CVC set occurring with the first peak and may record the first CVC set and the first peak in a look-up table.

10 Claims, 5 Drawing Sheets

HYBRID POWERTRAIN INPUT TORQUE MANAGEMENT

TECHNICAL FIELD

This disclosure relates to diagnosis, detection, and prevention of excessive torque in hybrid powertrains.

BACKGROUND

Motorized vehicles include a powertrain operable to propel the vehicle and power the onboard vehicle electronics. The powertrain, or drivetrain, generally includes an engine that powers a final drive system through a multi-speed transmission. In some vehicles, the engine is a reciprocating-piston type internal combustion engine. The transmission may be supplied with transmission fluid or transmission oil to lubricate the components therein.

Hybrid vehicles utilize multiple, alternative power sources to propel the vehicle, minimizing reliance on the engine for power. A hybrid electric vehicle (HEV), for example, incorporates both electrical energy and chemical energy, and converts the same into mechanical power to propel the vehicle and power any of the vehicle's systems. The HEV generally employs one or more electric machines (motor/generators) that operate individually or in concert with the internal combustion engine to propel the vehicle. An electric vehicle (EV) also includes one or more electric machines and energy storage devices used to propel the vehicle.

The electric machines convert kinetic energy into electrical energy, which may be stored in an energy storage device. The electrical energy from the energy storage device may then be converted back into kinetic energy for propulsion of the vehicle, or may be used to power electronics, auxiliary devices, or other components.

SUMMARY

A method or algorithm for controlling a powertrain having a hybrid transmission is provided. The hybrid transmission is disposed between an input member and an output member, and an on-board controller executes the method.

The method includes monitoring input torque at the input member and may include determining or calculating an oscillation torque. The method includes monitoring critical vehicle characteristics of the powertrain, including at least a transmission operating mode and an input speed of the input member. The method also includes operating the powertrain at the input torque.

The method compares input torque to a minimum threshold or oscillation torque to a fatigue threshold and identifies a first critical event. Critical events occur when the monitored input torque exceeds the minimum threshold or the oscillation torque exceeds the fatigue threshold. The method also identifies a first peak with the on-board controller during the first critical event. Peak events occur when the monitored input torque or oscillation torque changes between positive slope and negative slope.

The method further includes identifying a first critical vehicle characteristic set (first CVC set) occurring substantially concurrently with the first peak. The method may then record the first CVC set and the first peak in a look-up table accessible to the on-board controller.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
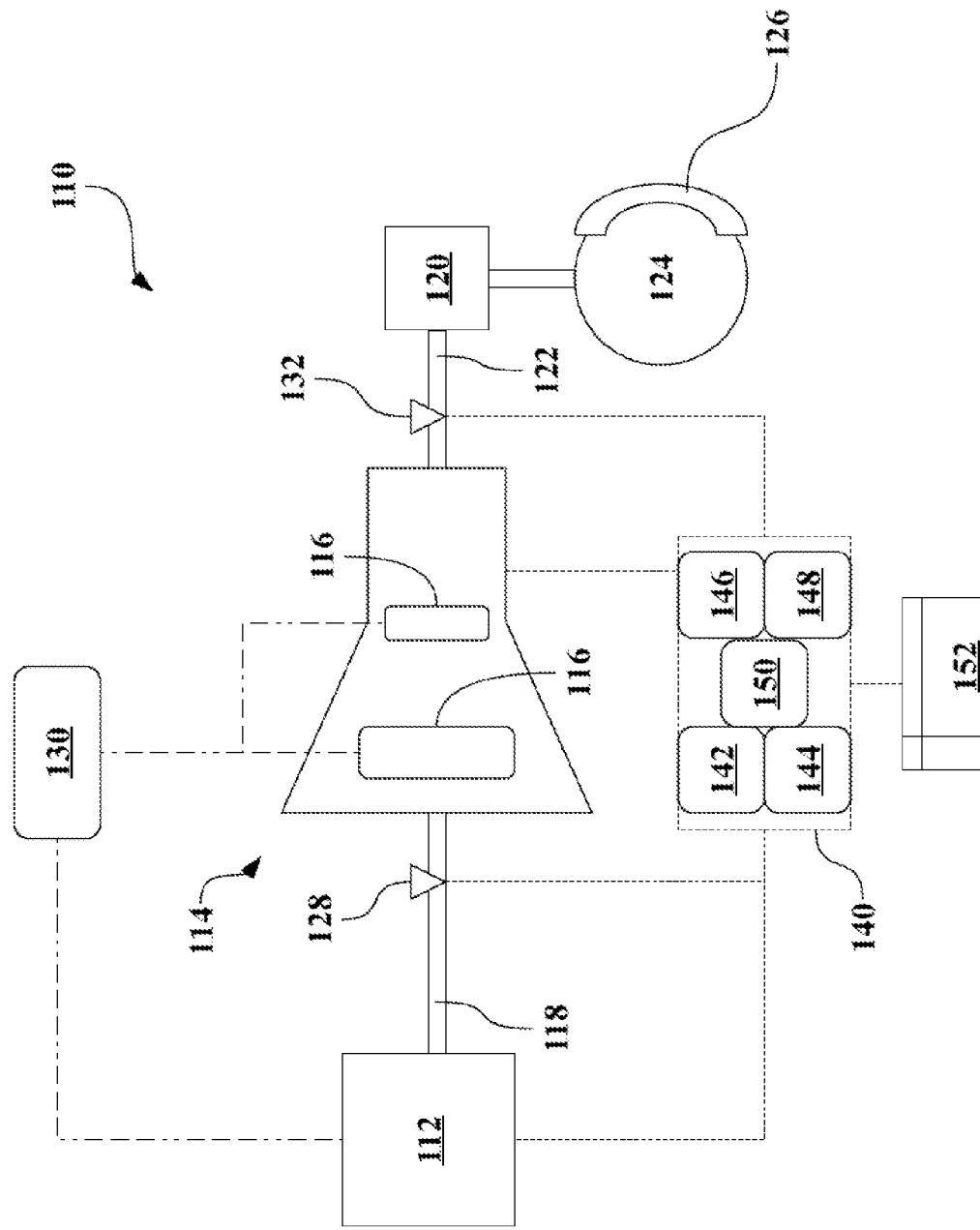
FIG. 1 is a schematic diagram of a hybrid powertrain usable with control methods described herein.

Referring to the illustrative drawings, like reference numbers correspond to like or similar components wherever possible throughout the several figures. FIG. 1 shows a highly-schematic, illustrative diagram of a powertrain 110. In the embodiment shown in FIG. 1, the powertrain 110 may generally be referred to as a hybrid powertrain or an alternative-fuel powertrain. Removal of some of the components of the powertrain 110 yields a conventional (non-hybrid) transmission, which is also described herein. The powertrain 110 may be incorporated into a hybrid vehicle (not shown) or a conventional vehicle (not shown). Features, components, or methods shown or described in relation to other figures may be incorporated into, and used with, the powertrain 110 shown in FIG. 1.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The powertrain 110 includes an internal combustion engine 112 and a transmission 114. The engine 112 is drivingly connected for mechanical powerflow with the transmission 114, which is a hybrid transmission having one or more electric machines 116. For illustrative purposes, the electric machines 116 may be referred to as a first and second electric machines 116, in any order, and there may be additional electric machines 116. Furthermore, the electric machines 116 may be disposed between the engine 112 and the transmission 114, within the transmission 114, or may be disposed adjacent the engine 112 and connected by a belt or chain to the engine 112.

An input shaft 118 operatively connects the engine 112 to the transmission 114, and provides input power to the transmission 114. The input shaft 118 may be illustrative of additional structures, including, without limitation: a flywheel, a damper, or other structures transferring mechanical power between the engine 112 and the transmission 114. In some embodiments of the powertrain 110, there may be a fluid coupling, such as a torque converter (not shown), between the engine 112 and the input shaft 118. Additionally, a damper (not shown) may be operatively attached between the output of the engine 112 and the transmission input shaft 118. The damper may be selectively changed between a locked state and an unlocked state.

An output shaft 122 is operatively connected to the transmission 114 and transfers output power from the transmission 114 to a final drive 120 (or driveline). Selection of operating modes of the transmission 114 changes the relationship between the input characteristics, such as an input torque and an input speed, at the input shaft 118 and the output characteristics, such as an output torque and an output speed, at the output shaft 122.

Note that the transmission 114 may be an electrically-variable transmission (EVT), such that the input characteristics of the input shaft 118 and the output characteristics of the output shaft 122 need not have fixed ratios of operation and may have continuously variable speed ratios. For example, in some embodiments of the powertrain 110, the output speed at the output shaft 122 may be positive even though the input speed at the input shaft 118 may be zero.

Hydraulically-actuated torque-transmitting mechanisms, such as clutches and brakes, are selectively engageable within the transmission 114 to establish different forward and reverse speed ratios or operating modes between the input shaft 118 and output shaft 122. The term clutch may be used generally to refer to both clutches and brakes. Shifting from one speed ratio or mode to another may occur in response to vehicle conditions and operator (driver) demands. The speed ratio is generally defined as the input speed divided by the output speed of the transmission 114. Thus, a low gear range has a high speed ratio, and a high gear range has a relatively lower speed ratio.

Electrically-variable transmissions, including the transmission 114, may be designed to operate in fixed-gear (FG) modes and EVT modes, which includes operation while the engine 112 is turned off. Because electrically-variable transmissions are not limited to single-speed gear ratios, the different operating states may be referred to as ranges or modes instead of gears. When operating in a fixed-gear mode, the rotational speed of the output shaft 122 of the transmission 114 is a fixed ratio of the rotational speed of the input shaft 118, which may be equivalent to the input speed from the engine 112. Electrically-variable transmissions are also configured for engine operation that is mechanically independent from the final drive, thereby enabling high-torque continuously-variable speed ratios, electrically dominated launches, regenerative braking, and engine-off idling and launches.

The final drive 120 may include a front or rear differential, or other torque-transmitting mechanism, and provides power output to one or more wheels 124 through respective vehicular axles or half-shafts (not shown). The wheels 124 may be either front or rear wheels 124 of the vehicle on which they are employed, or they may be a drive gear of a track vehicle. Those having ordinary skill in the art will recognize that the final drive 120 may include any known configuration, including front-wheel drive (FWD), rear-wheel drive (RWD), four-wheel drive (4WD), or all-wheel drive (AWD), without altering the scope of the claimed invention.

One or more friction brakes 126 are configured to convert kinetic energy into heat. The heat generated by the friction brakes 126 is dissipated to the atmosphere.

In addition to the engine 112, the electric machines 116 may act as traction devices or prime movers for the powertrain 110. The electric machines 116, which may be referred to as motors or motor/generators, are capable of converting kinetic energy into electrical energy and also of converting electrical energy into kinetic energy. A battery 130 acts as an energy storage device for the powertrain 110 and may be a chemical battery, battery pack, or another energy storage device (ESD). When the powertrain 110 is a hybrid powertrain, the battery 130 may be a high-voltage battery referred to as a hybrid battery or battery pack. Furthermore, the powertrain 110 may include a separate starting lighting and ignition (SLI) battery (not shown) or the SLI functions may be performed by the battery 130.

The electric machines 116 are in communication with the battery 130. When the electric machines 116 are converting electrical energy into kinetic energy, current flows from the battery 130 to the electric machines 116, such that the battery 130 is discharging stored energy. This may be referred to as motoring, or as a motor mode. Conversely, when the electric machines 116 are converting kinetic energy into electrical energy, current flows into the battery 130 from the electric machines 116, such that the battery 130 is being charged and is storing energy. This may be referred to as generating, or as a generator mode. Note, however, that internal losses of the electric machines 116, the battery 130, and the wiring of the powertrain 110 may alter the actual current flow between the battery 130 and the electric machines 116.

An input sensor 128 illustrates sensing, monitoring, or determining characteristics occurring at the input shaft 118. The input sensor 128 may determine the input torque and the input speed as the input shaft 118 enters the transmission 114. An output sensor 132 illustrates sensing, monitoring, or determining characteristics occurring at the output shaft 122, and may determine the output torque and the output speed of the transmission 114. In many configurations the input torque and speed are provided by estimations from other components, such that the input sensor 128 is simply illustrative of the location of the input torque and speed determination.

FIG. 1 shows a highly-schematic controller or control system 140, which is capable of operating the powertrain 110. The control system 140 is mounted on-board the vehicle and in communication with several components of the powertrain 110, and performs real-time, on-board detection and diagnostics for the powertrain 110. Furthermore, the control system 140 may alter subsequent operation of the powertrain 110 based upon the detection and diagnostics.

The control system 140 may include one or more components with a storage medium and a suitable amount of programmable memory, which are capable of storing and executing one or more algorithms or methods to effect control of the powertrain 110. Each component of the control system 140 may include distributed controller architecture, such as a microprocessor-based electronic control unit (ECU). Additional modules or processors may be present within the control system 140. The control system 140 may alternatively be referred to as a Hybrid Control Processor (HCP).

Electrical current is transferable to or from the battery 130 in accordance with whether the battery 130 is being charged or discharged. The control system 140 controls power inverters and motor controllers configured to receive control commands for providing motor drive or motor regeneration functionality. When the powertrain 110 is producing negative power—such that the powertrain 110 is attempting to decelerate the vehicle—the electric machines 116 may be placed into generator mode. The electric machines 116 then convert kinetic energy of the vehicle into electrical energy, which may be stored in the battery 130, if conditions of the battery 130 allow.

The control system 140 communicates with the input sensor 128 and the output sensor 132. Additional sensors or information-gathering components may also be included in the powertrain 110 and may communicate with the control system 140. In general, the control system 140 commands operation of the powertrain 110, including the engine 112 and the electric machines 116.

The control system 140 executes numerous functions, including those described herein. Some of the functions of the control system 140 may be executed by individual components of the control system 140, which are referred to as modules. Note, however, that the modules may not be physically-separate structures, but may be compartmentalized functions executed by the same physical structures of the control system 140. Any specific function described as within one of the modules may be executed by another module. Alternatively, all of the functions may simply be executed by the control system 140, as a whole, without separate identification of the modules.

A peak determination module 142 monitors input torque at the input shaft 118 and determines when the input torque exceeds a minimum threshold, which may be referred to as a critical event. The peak determination module 142 may also determine the peak of the input torque occurring during the critical event, which may be referred to as a peak event. The peak determination module 142 may also determine the critical vehicle characteristics of the powertrain 110 occurring substantially concurrently with the peak event.

A recording module 144 may record the peak events, and may also record the critical vehicle characteristics occurring along with the peak events. In some embodiments, the recording module 144 may also categorize the peak events according to a plurality of ranges, and may be alternatively referred to as a recording and sorting module 144.

An absolute or ultimate-strength limitation module 146 is configured to prevent operation of the powertrain 110 at levels that exceed ultimate-strength design limitations. The ultimate-strength limitation module 146 is configured to prevent input torque that may result in immediate minor or major impairment of one or more components of the powertrain 110. Therefore, the ultimate-strength limitation module 146 prevents input torque that may result in immediate component or system failure.

A fatigue limitation module 148 is configured to prevent operation of the powertrain 110 at levels that exceed fatigue design limitations. The fatigue limitation module 148 is configured to prevent input torque that may result in minor or major impairment of one or more components, over time as fatigue conditions build. Therefore, the fatigue limitation module 148 prevents input torque that may result in component or system failure resulting from repeated alternating or cyclic stresses.

A remediation/operation module 150 is configured to determine how to operate the powertrain 110 when one of, or both, the ultimate-strength limitation module 146 and the fatigue limitation module 148 are preventing operating of the powertrain 110 at a requested, or planned, input torque. When no remediation is needed, the remediation/operation module 150 may be passively allowing operating of the powertrain 110 at whatever critical vehicle characteristics are being requested.

Any functions performed by the control system 140 may be performed by any of the modules described herein, all of the modules, or additional modules incorporated into the vehicle, the powertrain 110, or the control system 140. The control system 140, and each of the modules thereof, is in communication with a look-up table 152, which may be stored within the control system 140. The look-up table 152 allows data collected in real time by the control system 140 to be stored for use in the future. The look-up table 152 may also be pre-populated with some initial data, to which the control system 140 adds while operating in real time. As described herein, the look-up table 152 may store operational characteristics of the powertrain 110 that will be prevented from occurring in the future.

The operator of the vehicle generally requests output conditions, such as an increase or decrease in vehicle speed. These requests may alternatively come from another control system, such as cruise control or traction control systems. The output request is transformed into commands for the powertrain 110, including, without limitation: operating conditions for the engine 112, operating mode of the transmission 114, and torque contributions (positive or negative) from the electric machines 116.

The numerous factors involved in providing traction to satisfy the operators output request may result in elevated levels of input torque to the transmission 114, which may be detrimental to components of the powertrain 110, such as the input shaft 118. Therefore, the on-board control system 140 is configured to use the control methods described herein to manage the powertrain 110 and minimize excursions of input torque that could be detrimental to the powertrain 110.

Figure 2A:
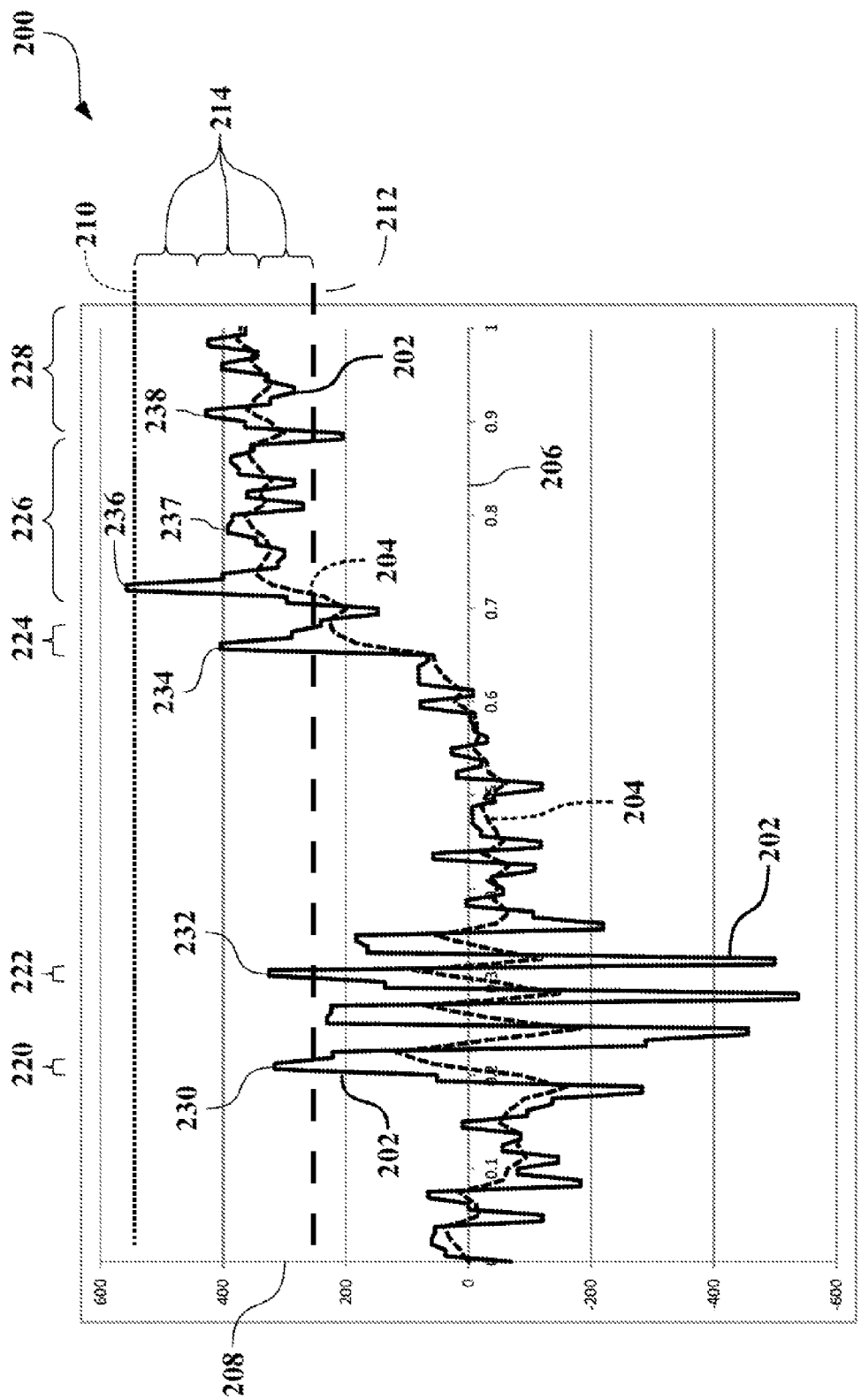
FIG. 2A is a schematic graphical representation of a raw input torque signal and an average torque signal, which may be utilized by the control methods described herein.
Figure 2B:
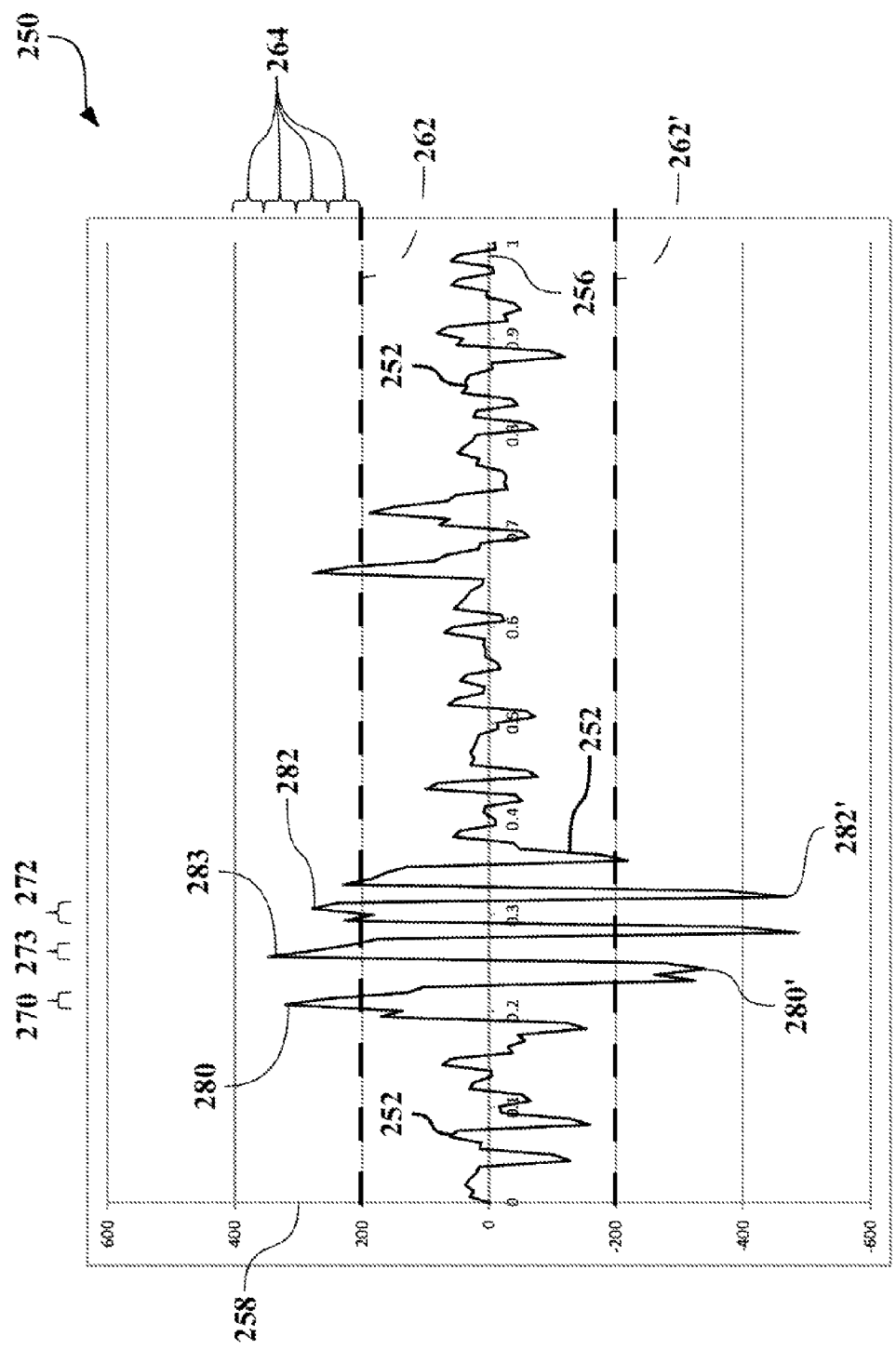
FIG. 2B is a schematic graphical representation of an oscillation torque, which may be calculated from the raw input torque signal and the average torque signal of FIG. 2A and may be utilized by the control methods described herein.

Referring now to FIG. 2A and FIG. 2B, and with continued reference to FIG. 1, there are shown charts illustrating implementation or tracking of control methods described herein. FIG. 2A may be used for tracking and diagnosis of absolute limits and uses raw torque, but may also be used in some circumstances for tracking and diagnosis of fatigue limits. FIG. 2B may be particularly useful for tracking and diagnosis of fatigue limits and uses oscillation torque instead of raw torque.

FIG. 2A shows a chart 200 representing or illustrating an input torque signal 202, which may also be referred to as raw input torque and is shown with a solid line. The chart 200 also illustrates several characterizing features of the input torque signal 202 that may be determined and utilized as part of the control methods described herein. The input torque signal 202 may be determined by the input sensor 128 at the input shaft 118, or may be derived from other characteristics of the powertrain 110 and, particularly, the engine 112. The control system 140 is monitoring, either continuously or iteratively, the behavior of the input torque signal 202.

The chart 200 further includes an average torque signal 204, which may also be referred to as mean torque and is shown with a dashed line. The average torque signal 204 may be derived from the input torque signal 202, such as through the use of filtering or mathematical techniques, and represents a time-based mean or average of the input torque signal 202. Therefore, the average torque signal 204 fluctuates based upon the input torque signal 202, but does so in a less drastic (or less noisy) fashion. The average torque signal 204 shown in FIG. 2A is highly illustrative and may not be representative of the actual mean of the input torque signal 202.

The chart 200 illustrates time along a horizontal axis 206, the x-axis, the units of which may be seconds. Input torque is illustrated along a vertical axis 208, the y-axis, the units of which may be Newton-meters (N-m) or the like. All values and units are solely for illustrative purposes and are in no way limiting. Furthermore, the values may be illustrative of other units, such as pound-feet along the vertical axis 208.

The control system 140 may be determining the input torque signal 202 by sampling input torque with a fixed or variable interval, such that input torque signal 202 is actually formed from individual data points, as opposed to being a continuous signal. Therefore, each data point or sample may be referred to as an instantaneous or current point, which may be referred to as time or point n. Furthermore, immediately preceding or following data points may be referred to as time or point n−1 and n+1, respectively.

An absolute or ultimate-strength threshold 210 represents the level of input torque that may result in immediate component or system failure. When the input torque signal 202 crosses the ultimate-strength threshold 210, the event may result in minor or major impairment of one or more components of the powertrain 110. This threshold is viewed from a short-term perspective. In general, it is preferred to minimize the number of occurrences of input torque levels exceeding the ultimate-strength threshold 210.

A minimum threshold 212 represents raw input torque that may result in minor or major impairment of one or more components due to fatigue conditions. When the input torque signal 202 crosses the minimum threshold 212 many times, the cumulative effects may result in long-term component or system failure resulting from repeated alternating or cyclic stresses. This type of fatigue determination uses raw input torque, as contrasted with oscillation torque for fatigue determination shown in FIG. 2B. The minimum threshold 212 also represents a level of input torque at which the control system 140 may increase computational resources devoted to monitoring and controlling the powertrain 110.

The control system 140 will determine the magnitude of events crossing the minimum threshold 212 or the ultimate-strength threshold 210 and the reasons therefore. The values of the minimum threshold 212 and the ultimate-strength threshold 210 shown in chart 200 are illustrative and exemplary, and the actual levels of all thresholds used by the control system 140 will depend upon the individual components of the powertrain 110.

The chart 200 also illustrates one or more range thresholds 214 between the minimum threshold 212 and the ultimate-strength threshold 210. These range thresholds 214 demonstrate possible divisions for assessing cumulative levels of fatigue resulting from different magnitudes of input torque to the transmission 114, under the raw fatigue technique. For example, higher magnitudes of input torque may result in fatigue failures more quickly than relatively lower magnitudes. An additional range threshold may be defined as occurring above the ultimate-strength threshold 210. Note that alternative techniques may be used for fatigue evaluation, such as the oscillation fatigue technique shown in FIG. 2B, which uses differentials between the input torque signal 202 and the average torque signal 204 to determine fatigue.

As shown in the chart 200, whenever the input torque signal 202 crosses the minimum threshold 212, which may act as a minimum threshold, the control system 140 considers that crossing as a critical event. The peak determination module 142 may be utilized to determine when the input torque signal 202 crosses the minimum threshold 212. For illustrative purposes, the input torque signal 202 shown in the chart 200 crosses the minimum threshold 212 many times. However, in practice the actual input torque may pass the minimum threshold less often than shown.

Alternatively, the control system may only monitor for peak events when the input torque signal 202 crosses the ultimate-strength threshold 210. In which case the control system 140 would not determine any fatigue analysis directly resulting from the input torque signal 202. The critical event 226 represents the only time period during which the input torque signal 202 is above the ultimate-strength threshold 210, and the control system 140 may not be monitoring for peaks of the input torque signal 202 during the remainder of the period shown in the chart 200.

A first critical event 220 represents the time period during which the input torque signal 202 is above the minimum threshold 212. Similarly, a second critical event 222, a third critical event 224, a fourth critical event 226, and a fifth critical event 228 represent excursions of the input torque signal 202 above the minimum threshold 212.

Alternatively, critical events may be defined based upon the input torque signal 202 crossing the average torque signal 204. Although the average torque signal 204 changes, the input torque signal 202 crossing the average torque signal 204 is indicative of localized fluctuations or oscillations in torque, and these oscillations may lead to fatigue damage in the input shaft 118. This configuration is illustrated in FIG. 2B.

In order to minimize throughput, some functions of the peak determination module 142 and the other modules in the control system 140 may remain passive or not be accessed until the input torque signal 202 moves above the ultimate-strength threshold 210 or the minimum threshold 212. Alternatively, the control system 140 may be operating continuously or may increase computational resources devoted to monitoring the powertrain 110 during the first critical event, and subsequent events.

The control system 140 determines the maximum magnitude when the input torque crosses the minimum threshold 212, such as with the peak determination module 142. A first peak 230 is the maximum level of the input torque signal 202 occurring during the first critical event 220. The control system 140 or the peak determination module 142 may find the first peak 230 by recording when the monitored input torque signal 202 changes between positive slope and negative slope.

The control system 140 may use numerous other methods or techniques to find positive and negative peaks in the input torque signal 202. For example the control system 140 may log the value of the input torque signal 202 at each sampling point (n) and then compare that instantaneous value to the previous point (n−1). If the instantaneous point is greater than the previous point, the control system knows that the input torque signal 202 increased and that point value is kept or logged. If the instantaneous point is lesser than the previous point, the control system knows that the input torque signal 202 decreased between sample iterations, and that point value is not kept or is not logged. Therefore, the maximum value in the log is the peak point of the event. The log may be reset whenever the input torque signal 202 crosses the minimum threshold, such as the minimum threshold 212 or the average torque signal 204.

A second peak 232 occurs during the second critical event 222. Similarly a third peak 234, a fourth peak 236, and a fifth peak 238 are the maximums during the third critical event 224, the fourth critical event 226 and the fifth critical event 228, respectively. Note that maximum peaks occurring below the minimum threshold, which is the minimum threshold 212 in this illustration, may not be counted as peak events—and may not be recorded for subsequent use, as explained herein.

A double peak 237 also occurs during the fourth critical event 226 along with the fourth peak 236. Because the second critical event has at least two distinct peaks, the control system 140 may either take the highest value as the peak value for the fourth critical event 226 or may treat the peaks as having occurred during distinct events. For illustrative purposes, this description will use the highest magnitude as the maximum of the fourth critical event 226, which is the fourth peak 236.

If the control system 140 is only monitoring for excursions beyond the ultimate-strength threshold 210, the fourth critical event 226 and the fourth peak 236 are the only recorded events. Therefore, the control system 140 may be sleeping until the fourth critical event 226 but would then determine the fourth peak 236.

The peak determination module 142 may also determine the critical vehicle characteristics of the powertrain 110 occurring substantially concurrently with the peak events. The critical vehicle characteristics may include, for example and without limitation: an operating mode of the transmission 114, such as a fixed gear, an electrically-variable transmission (EVT) mode, or neutral; an input speed of the input shaft 118, which may or may not be equivalent to an engine speed of the engine 112; an output speed of the output shaft 122; engine torque; output torque; and a displacement-on-demand mode, such as whether all cylinders of the engine 112 are operating.

Note that the chart 200 is illustrative of both positive and negative input torque levels. However, designation as positive and negative relative to the input shaft 118 may be made in either direction, although the direction of rotation resulting from normal operation of the engine 112 is likely to define or coincide with the direction of positive torque.

The first through fifth peaks 230-238 are recorded by the control system, such as by the recording module 144. Furthermore, the control system 140 may also record the critical vehicle characteristics occurring concurrently with the first through fifth peaks 230-238. Table 1 and Table 2 illustrate diagnosis of operating conditions of the powertrain 110 by the control system 140 on-board the vehicle.

TABLE 1

| Peak | Input Torque | Input Speed | Engine Torque | Output Speed | Output Torque | Mode |
|---|---|---|---|---|---|---|
| 232 | 310 | 2200 | 125 | 2000 | 1200 | EVT 2 |
| 234 | 405 | 0 | 0 | 1500 | 1000 | EVT 1 |
| 236 | 560 | 3300 | 100 | 1100 | 300 | FG 3 |

Table 1 illustrates some of the critical vehicle characteristics occurring substantially concurrently with the second peak 232, the third peak 234, and the fourth peak 236. These critical vehicle characteristics may be recorded by the control system 140 and stored in the look-up table 152, along with any additional data collected or created by the control system 140. Note that these critical vehicle characteristics represent specific operating states of the powertrain 110 that have caused the input torque signal 202 to exceed the ultimate-strength threshold 210 or the minimum threshold 212. If the control system is only monitoring for excursions above the ultimate-strength threshold 210, then the only entry into Table 1 would be the fourth peak 236.

The critical vehicle characteristics in Table 1 are: input speed, engine torque, output speed, and output torque, but these are only illustrative. Other data may be included in the critical vehicle characteristics recorded, such as displacement on demand or active fuel management (i.e., the number of cylinders undergoing combustion in the engine 112), the torque output of the electric machines 116 (which may be either negative or positive), or the speed of the electric machines 116.

As shown in Table 1, the second peak 232 may occur during an EVT 2 mode. The critical vehicle characteristics occurring substantially simultaneously with the second peak 232 would then be stored in the look-up table 152 for future reference as a set of characteristics that caused the input torque to rise above the minimum threshold level of the minimum threshold 212. The respective critical vehicle conditions for the third peak 234 and the fourth peak 236 will also be recorded.

As described herein, the control system 140 may subsequently check the look-up table 152 to determine whether any specific set of critical vehicle characteristics is likely to cause excursions above the ultimate-strength threshold 210. In some situations, the control system 140 may also prevent excursions above the minimum threshold 212. If the critical vehicle characteristics requested by the operator would cause elevated input torque or large input torque oscillations, the control system 140 may alter operation of the powertrain 110 to avoid the elevated input torque or input torque oscillation.

For example, the fourth peak 236 passes beyond the ultimate-strength threshold 210. Therefore, the control system may identify the critical vehicle characteristics occurring along with the fourth peak 236 as a banned operating state. Portions of the look-up table 152 may be designated for identifying the banned operating states, or a separate look-up table may be used as a banned list.

As shown in FIG. 2B, the control system 140 may also incorporate fatigue analysis or cumulative fatigue analysis, and may identify fatigue-causing critical vehicle characteristics as banned operating states. FIG. 2B shows a chart 250 having time along an x-axis 256 and torque a y-axis 258. The chart 250 includes an oscillation torque 252, which may represent or illustrate the calculated difference between the input torque signal 202 and the average torque signal 204 shown in FIG. 2A. Note that the x-axis 256 is actually the average torque signal 204.

Fatigue stresses may occur through oscillation between opposing states, such as positive and negative torque. However, fatigue stresses may occur through oscillation across a central state, such as the average torque signal 204. The oscillation torque 252 represents the spread between the input torque signal 202 and the average torque signal 204 as the central state.

The chart 250 illustrates a fatigue threshold 262 with a dashed line at an oscillation torque of approximately 200. Similarly, a negative fatigue threshold 262' mirrors the fatigue threshold 262 for oscillation torque below the average torque signal 204. Numerous fatigue ranges 264 are illustrated on the positive side of the chart 250 and there may also be opposing fatigue ranges (not illustrated).

The chart 250 illustrates an alternative technique that may improve fatigue analysis over using the raw torque shown in chart 200. Therefore, the control system 140 may monitor both the input torque signal 202 and the oscillation torque 252, with the input torque signal 202 being used to determine excursions beyond the ultimate-strength threshold 210 and the oscillation torque 252 being used for fatigue analysis during excursions beyond the fatigue threshold 262.

For illustrative purposes, the chart 250 illustrates a first fatigue event 270 and a second fatigue event 272. These fatigue events are time periods during which the oscillation torque 252 exceeds the fatigue threshold 262. During the first fatigue event 270 and the second fatigue event 272, the peak determination module finds a first fatigue peak 280 and a second fatigue peak 282. Note that the chart 250 shows other fatigue events that are not separately identified.

The first fatigue peak 280 and the second fatigue peak 282 generally occur at the same time as the first peak 230 and the second peak 232 show in FIG. 2A. However, there is also a third fatigue event 273 and a third fatigue peak 283 intermediate the first fatigue peak 280 and the second fatigue peak 282. The third fatigue peak 283 may not have triggered a fatigue event under the raw torque fatigue system shown in chart 200. However, because the chart 250 uses oscillation analysis, it recognizes that the third fatigue peak 283 is a significant fatigue event.

TABLE 2

| Range | Event Count | Maximum Fatigue | Fatigue Ratio |
| --- | --- | --- | --- |
| >400 | 52 | 500 | 0.10 |
| 350-400 | 170 | 1000 | 0.17 |
| 300-350 | 351 | 2500 | 0.14 |
| 250-300 | 899 | 5000 | 0.18 |
| 200-250 | 2269 | 10000 | 0.23 |

Table 2 illustrates application of the control methods to minimize fatigue failures through division and organization of fatigue events into ranges, such as the fatigue ranges 264 shown in chart 250. The first through third fatigue peaks 280-283 are divided into ranges based upon their respective magnitudes. Each of the first through third fatigue peaks 280-283 increases the event count within its respective range. Note that the ranges need not cover the same spectrum, but may have equal magnitude in some configurations. Furthermore, Table 2 may also include a count for excursions beyond the ultimate-strength threshold 210, regardless of the oscillation torque occurring on the excursions.

As illustrated in the chart 250 and Table 2, the first fatigue peak 280 may increase the event count in the 300-350 range, the second fatigue peak 282 may increase the event count in the 250-300 range, and the third fatigue peak 283 may increase the event count in the 350-400 range. Depending upon the embodiment, each of the first through third fatigue peaks 280-283 may be used as one event count in Table 2 or the first through third fatigue peaks 280-283 may be paired with opposing, negative peaks, to yield each event count.

For fatigue analysis, the control system 140 may pair positive and negative peaks of similar magnitude and use those pairs as the event counts illustrated in Table 2. Positive and negative peaks may be defined based upon positive torque and negative torque or, more likely, based upon positive and negative spreads or oscillations relative to the oscillation torque 252. For example, an opposing fatigue peak 280' may be paired with the first fatigue peak 280 and an opposing peak 282' may be paired with the second fatigue peak 282. These pairings are made based upon consecutive, time-based crossings of the average torque signal 204, which is the zero line of the x-axis 256 in chart 250.

When determining the fatigue range, the pairs may be counted based upon an average of the magnitude of the fatigue peak and opposing peak. Alternatively, the peaks may always be paired with opposing peaks having magnitude in the same range, instead of using the nearest opposing peak.

The fatigue event counts may be compared against maximum fatigue levels or counts. For example, there may be a maximum number of event counts that can occur in any range, such as the Maximum Fatigue column in Table 2. When the fatigue event count in any range reaches its maximum, the control system 140 predicts that fatigue failure may be imminent and remediation may be needed to prevent failure due to, at least, that range.

Alternatively, the fatigue limits for each range may be based upon a fatigue ratio, which, as shown in Table 2, is the ratio of the event count to the maximum fatigue in each range. By using fatigue ratio, the same ratio value may be used for determining limits from any fatigue range. For example, any fatigue ratio of greater than 0.3 may be considered excessive, regardless of the specific range in which the ratio occurs.

Furthermore, the individual fatigue ratios for each range may be summed or combined to determine an overall excessive fatigue state, even when no individual range has exceeded its specific ratio limit. For example, the fatigue limits may be excessive whenever the sum of each fatigue ratio exceeds 0.8. In Table 2, none of the individual fatigue ratios exceeds the illustrative limit of 0.3, but the combined fatigue ratio is approximately 0.82. Therefore, the combined fatigue ratio may trigger the need for remediation or protection from fatigue failures.

When fatigue limits are exceeded, either as absolute limits, individual ratios, or the combined ratio, remediation may occur by blocking operating modes that are known to cause the oscillation torque signal 252 to exceed the fatigue threshold 262. The control system 140 may implement remediation in different ways by placing different sets of critical vehicle characteristics onto the banned list.

Where an individual fatigue limit for a specific range is violated (either the absolute value or the ratio), remediation may occur by preventing only critical vehicle characteristics that result in the oscillation torque signal 252 reaching that specific range. Therefore, only critical vehicle characteristics from the specific range (for example, the 350-400 range in Table 2) would be placed on the banned list by the control system 140.

Alternatively, the control system 140 may prevent operation at any critical vehicle characteristics that will cause oscillation torque signal 252 to exceed the fatigue threshold 262, even though only one of the ranges has been violated and others remain below their respective limits. Therefore, all critical vehicle characteristics resulting in oscillation torque signal 252 exceeding the fatigue threshold 262 would be placed on the banned list once any range exceeds its fatigue allowance.

Where the combined fatigue ratio has been exceeded, the control system 140 may prevent operation at any critical vehicle characteristics that will cause the oscillation torque signal 252 to exceed the fatigue threshold 262, such that all critical vehicle characteristics resulting in oscillation torque signal 252 exceeding the fatigue threshold 262 would be placed on the banned list. This may be beneficial because the combined fatigue ratio represents a composite of the fatigue caused by fatigue events in all of the ranges.

In order to prevent the powertrain 110 from repeatedly exceeding the fatigue threshold 262 or the ultimate-strength threshold 210 due to operating conditions known to cause excursions above the fatigue threshold 262 or the ultimate-strength threshold 210, the control system 140 prevents the powertrain from operating at any of the critical vehicle characteristics on the banned list. Preventing the powertrain 110 from operating at banned critical vehicle characteristics may be referred to as remediation.

One technique for remediation involves placing the vehicle into a reduced performance mode, including shutting down the vehicle. Other techniques for remediation involve altering specific characteristics, such as speed or torque requests for individual components, of the powertrain 110 to move away from the banned critical vehicle characteristics while still satisfying the overall output request.

Figure 3A:
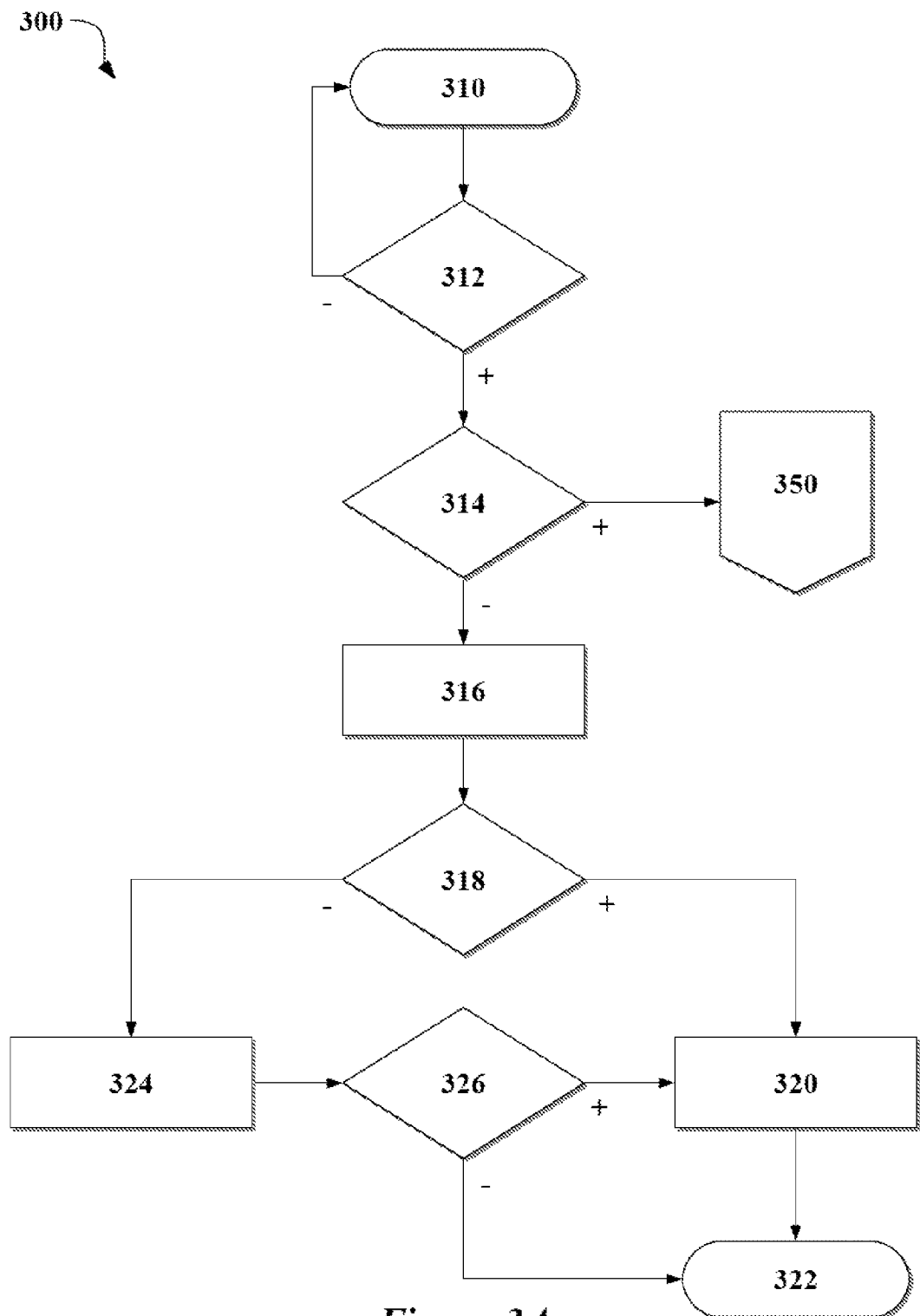
FIG. 3A is a schematic flow chart diagram of one, exemplary, control method for a hybrid powertrain.
Figure 3B:
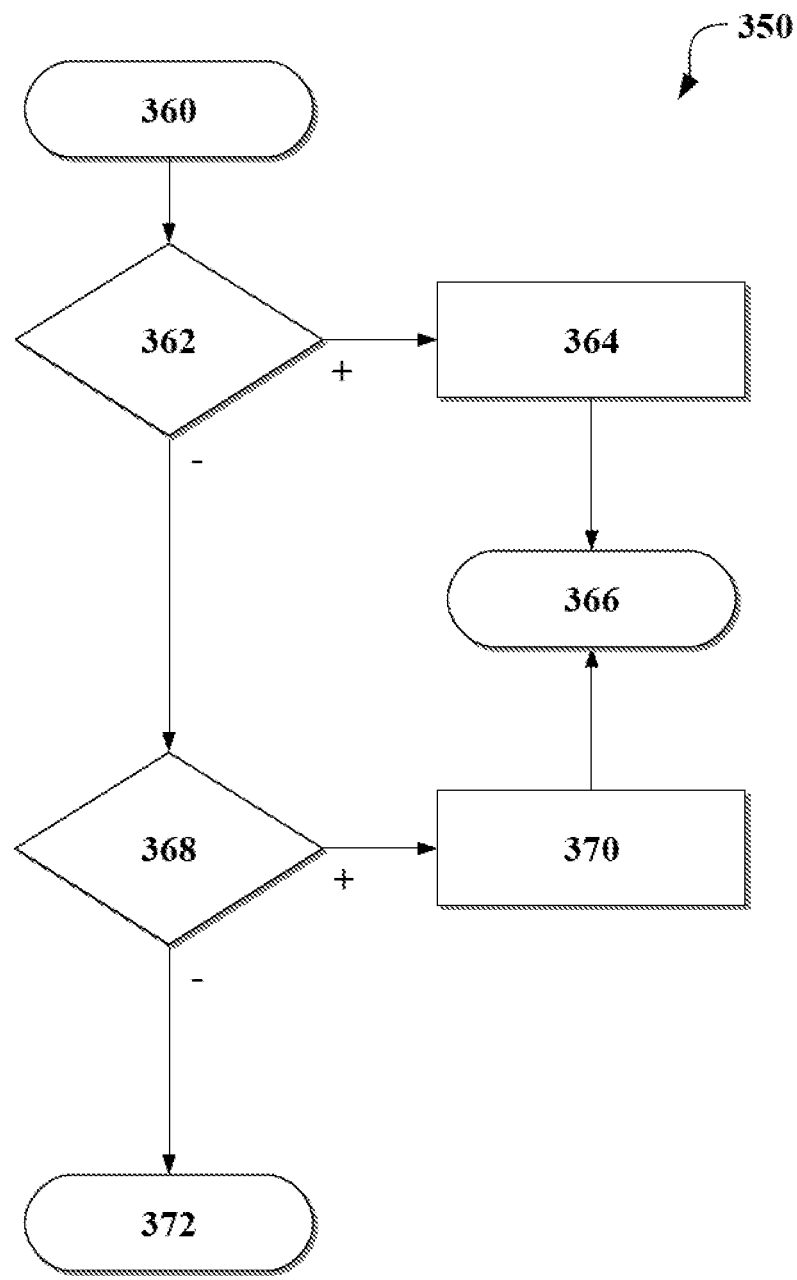
FIG. 3B is a schematic flow chart diagram of a portion of the method illustrated in FIG. 3A.

Referring now to FIG. 3A and FIG. 3B, and with continued reference to FIGS. 1 and 2, there is shown a method 300 for controlling a hybrid powertrain, such as the powertrain 110 shown in FIG. 1. FIG. 3A shows the whole method 300, and FIG. 3B shows a remediation routine 350, which is a subroutine or portion of the method 300. The remediation routine 350 is shown on a separate sheet solely for illustrative purposes, but is part of the method 300 shown in FIG. 3A.

FIGS. 3A and 3B show only a high-level diagram of the method 300. The exact order of the steps of the algorithm or method 300 shown is not required. Steps may be reordered, steps may be omitted, and additional steps may be included. Furthermore, the method 300 may be a portion or sub-routine of another algorithm or method.

For illustrative purposes, the method 300 may be described with reference to the elements and components shown and described in relation to the other figures and may be executed by the powertrain 110 itself or by the control system 140. However, other components may be used to practice the method 300 and the invention defined in the appended claims. Any of the steps may be executed by multiple controls or control system components.

Step 310: Start/Begin Monitoring.

The method 300 may begin at a start or initialization step, during which time the method 300 is made active and is monitoring operating conditions of the vehicle, the powertrain 110 and, particularly, the engine 112 and the transmission 114. Initiation may occur, for example, in response to the vehicle operator inserting the ignition key or in response to specific conditions being met. The method 300 may be running constantly or looping constantly whenever the vehicle is in use.

As the control system 140 executes the method 300 from on-board the vehicle, it monitors at least one of an input torque and a torque oscillation at an input member, which is the input shaft 118 in the powertrain 110. The control system 140 also monitors critical vehicle characteristics of the powertrain 110. The critical vehicle characteristics include, at least: an operating mode of the transmission 114 and an input speed of the input shaft 118. Additional critical vehicle characteristics may include, without limitation: displacement on demand state, engine torque, damper state (locked or unlocked), or torque converter state.

Step 312: Input Torque Greater than Minimum Threshold?

The method 300 includes comparing the input torque to a minimum threshold. In some cases, the minimum may be the minimum threshold 212, the average input torque 204, or the fatigue threshold 262. In other cases, particularly where fatigue failures are not accounted for by the method 300, the minimum threshold may be the ultimate-strength threshold 210.

When the input torque signal 202 or the oscillation torque 252 crosses the respective minimum, the control system 140 realizes that input torque may be exceeding preferred levels. Alternatively stated, the method 300, in effect, begins paying closer attention to input torque levels when they exceed the minimum threshold.

If the input torque is not greater than the minimum threshold, the method 300 loops back to the beginning or ends for that iteration. Therefore, computational throughput is minimized until the input torque exceeds the minimum threshold. Step 312 may alternatively be viewed as part of the initiation of the method 300, such that the method 300 does not start, or does not begin using resources, until the input torque exceeds the minimum threshold.

However, when the control system 140 recognizes that input torque exceeds the minimum threshold, the method 300 identifies that a critical event, such as a first critical event, is occurring. Generally, critical events last for the duration of time in which the monitored input torque exceeds the minimum threshold. Once the critical event is identified, the method 300 may then determine whether to intervene in operation of the powertrain 110.

Step 314: Powertrain Requesting Banned Critical Vehicle Characteristics?

The method 300 compares the requested critical vehicle characteristics, as monitored in step 310, to a banned list. The banned list may be pre-populated during manufacture of the vehicle; may be derived from previous loops of the method 300, such as the illustrative observation of the fourth peak 236 shown in Table 1; or may be derived from combinations of sources. The banned list may be stored in a look-up table, such as the look-up table 152.

If the powertrain 110 is requesting banned critical vehicle characteristics, the method 300 moves to a remediation routine 350. The method 300 includes the remediation routine 350, but only calls the remediation routine 350 when needed, which may reduce overall throughput costs of the method 300. The remediation routine 350 is shown on a separate sheet for illustrative purposes only.

In some configurations of the method 300, steps 312 and 314 may be reversed, such that the control system 140 is always comparing the requested critical vehicle characteristics to the banned list, regardless of whether the input torque is greater than any minimum threshold. However, such a configuration may require additional computational resources. In the method 300, as shown, the control system 140 does not utilize resources to compare the critical vehicle characteristics to the banned list unless there is an excursion of input torque beyond the minimum threshold, i.e., until the input torque signal 202 crosses the minimum threshold 212 or the oscillation torque 252 crosses the fatigue threshold 262.

Note that, if the remediation routine 350 is not commanded based upon banned critical vehicle characteristics, the control system 140 will be operating the powertrain 110 at the input torque level resulting from the requested critical vehicle characteristics. However, the control system 140, and the method 300, will record data from the critical event and may take steps to prevent future excursions of the input torque based upon the same critical vehicle characteristics, if needed.

Step 316: Find Peak Input Torque and Record CVC at Peak.

If the powertrain 110 is not requesting banned critical vehicle characteristics, instead of calling the remediation routine 350, the method 300 moves to step 316 to find the maximum peak input torque during the critical event. The control system 140 identifies a first peak with the on-board control system 140 during the first critical event. This is illustrated in either chart 200 or chart 250, where the control system 140 identifies the first peak 230 during the first critical event 220 or the first fatigue peak 280 during the first fatigue event 270.

Peak events occur when the monitored torque, such as the input torque signal 202 of chart 200 or the oscillation torque 252 of chart 250, changes between positive slope and negative slope, regardless of whether the signal is positive or negative. The control system 140 may identify the peak events via other signal processing techniques. For example, and without limitation, the control system 140 may compare the absolute value of each iteration or sample of the signal to the previous value. Furthermore, filtering techniques may be used by the control system 140 to avoid falsely identifying peaks as a result of signal noise (small oscillations in the signal that do not represent actual input torque peaks).

Once the control system 140 identifies the peak event, it may also note or identify a first critical vehicle characteristic set (which may be referred to herein as a first CVC set) occurring substantially concurrently or simultaneously with the first peak event. The method 300 also records the first CVC set and the first peak in a look-up table accessible to the control system 140. As illustrated in Table 1, the control system 140 may record that the fourth peak 236 occurs concurrently with input speed at approximately 3300 RPM while the transmission 114 is in FG3 mode, in addition to other critical vehicle characteristics as part of the first CVC set.

Note that even when the peak event is below the absolute threshold, and the critical vehicle characteristics will not be added to the banned list, the method 300 may still record the critical vehicle characteristics. For example, a second CVC set occurring concurrently with the second peak 232 does not warrant adding to the banned list. However, the method 300 records the second CVC set for use in fatigue determinations. Contrarily, the CVC set occurring concurrently with the fourth peak 236 would warrant addition to the banned list. Note that the second peak 232 would be recorded under either the raw fatigue technique shown in FIG. 2A or the oscillation fatigue technique shown in FIG. 2B.

Step 318: Peak Greater than Absolute Threshold?

The method 300 then compares the first peak to a maximum threshold, such as the ultimate-strength threshold 210. The maximum threshold is always greater than the minimum threshold, whether the minimum threshold is coincident with the minimum threshold 212 or another value.

Step 320: Add CVC to Banned List.

If the first peak exceeds the maximum threshold, as does the fourth peak 236 shown in FIG. 2A, the control system 140 adds the first CVC set to the banned list. On subsequent loops of the method 300, the control system 140 may recognize the fourth CVC set on the banned list and prevent the powertrain 110 from subsequently operating at the fourth CVC set, particularly when the input torque signal 202 has already crossed the minimum threshold.

Step 322: Repeat/Monitor.

The method 300 then repeats and begins monitoring the input torque signal 202. This may be considered another loop or iteration of the method 300, or a continuation thereof.

When the input torque signal 202 crosses the minimum threshold again, the method 300 identifies a second critical event, such as the second critical event 222 shown in FIG. 2A. The method 300 identifies a second peak and a second CVC set of the monitored input torque and progresses to step 318 to compare the second peak 232 to the maximum threshold.

If the second peak 232 were above the maximum threshold, the second CVC set would be added to the banned list. However, if the control system 140 determined in step 318 that the peak event was not greater than the absolute threshold, the critical vehicle characteristics causing the peak event are not automatically entered as banned events. These lesser peak events are still recorded to help prevent fatigue failures.

The oscillation torque 252 also crosses the fatigue threshold 262 substantially concurrently as the input torque signal 202 crosses the minimum threshold 212. Therefore, the second fatigue event 272 and the second fatigue peak 272 would also be noted.

Step 324: Record the Fatigue Event.

As shown in FIG. 2A and Table 1, the first peak 230 and the second peak 232 do not exceed the ultimate-strength threshold 210, so the method 300 may or may not prevent subsequent operation of the powertrain 110 at the first CVC set and the second CVC set. Rather, the method 300 proceeds to step 324 to analyze possible fatigue failures.

The method 300 records the second CVC set and the second fatigue peak 282 in the look-up table in the corresponding fatigue range, by comparing the second fatigue event to a range-differentiated threshold scale. The range-differentiated threshold scale may have a low range, one or more mid ranges, and a high range, which are respectively ordered between the minimum threshold and the maximum threshold. The range-differentiated threshold scale may also have an excess range, which is above the maximum threshold. For oscillation fatigue, the ranges may be ordered in increasing fashion above the fatigue threshold 262.

The method 300 may have also recorded the first CVC set and the first peak in the look-up table in the corresponding fatigue range, if the event crossed the fatigue threshold. The method 300 increases the fatigue count of the corresponding fatigue range. The method 300 increases one of a low-range count, a mid-range count, a high-range count, and an excess-range count, according to the location of the fatigue peaks within one of the fatigue ranges, as shown in Table 2.

Step 326: Fatigue Limits Exceeded?

After increasing the fatigue count in the specific range, the method 300 further includes determining whether fatigue limits have been exceeded. These limits may be either absolute limits or ratio-based limits.

In absolute limits configurations, the method 300 compares the low-range count to an individual low-range limit, the mid-range count to an individual mid-range limit, and the high-range count to an individual high-range limit. If any of the ranges exceeds its respective limit, the method 300 will attempt to prevent future fatigue events in that range.

As the method 300 determines, in step 326, that fatigue limits have been violated, the control system 140 will add all necessary critical vehicle characteristics to the banned list. This may include adding critical vehicle characteristics from only the violated fatigue range or may include adding vehicle characteristics from all fatigue ranges.

For example, if the low-range count exceeds the individual low-range limit, the method 300 may add the CVC sets causing fatigue events in the low range to the banned list. Therefore, the control system 140 will prevent the powertrain 110 from subsequently operating at any CVC set within the low range, such that the low-range count is prevented from subsequently increasing. Similar steps may occur for the mid range and the high range to prevent the powertrain 110 from subsequently increasing the mid-range count and the high-range count after those limits have been exceeded.

The method 300 may further add all CVC sets for all fatigue ranges to the banned list, even if only one of the ranges has been exceeded. In such a configuration, the control system 140 prevents operation at any CVC set that would cause fatigue events, or prevent operation at any CVC set that would cause fatigue events at or above the violated fatigue range.

Alternatively, the method 300 may use ratio-based fatigue determination, as also demonstrated in Table 2. In such a configuration, the method 300 includes finding the individual fatigue ratio for each fatigue range and comparing the individual fatigue ratio to a fatigue ratio limit.

For example, the fatigue ratio limit may be 0.2, in which case Table 2 indicates that the low range (200-250) has exceeded the fatigue ratio. The method 300 may then prevent operation at the CVC sets that cause fatigue events in the low range, or may prevent operation at all CVC sets that cause fatigue events in any range.

Furthermore, the fatigue may be assessed by analysis of the total or combined fatigue ratio in addition to the individual fatigue ratios. In the example illustrated in Table 2, only the low range has been exceeded, such that the method 300 prevents operation at the CVC sets in the low range based thereupon. However, the method 300 may also compare the combined fatigue ratio to a combined maximum to determine whether operation at all fatigue ranges should be banned due to cumulative effects of each individual fatigue range.

In Table 2, the combined fatigue ratio is equal to 0.82. If the combined fatigue ratio exceeds 1.00, the method 300 may ban operation at any CVC set that causes a fatigue event, regardless of whether any of the individual fatigue ratios exceeds the fatigue ratio limit. This represents a determination that cumulative effects of fatigue in all of the ranges may result in fatigue failure even when none, or only some, of the individual fatigue ranges have been exceeded.

If no individual fatigue range limits are exceeded or no ratio-based limits are exceeded, the method 300 proceeds to step 322 to repeat. Where some fatigue limit is exceeded, the method 300 proceeds to step 320 and adds the relevant CVC sets to the banned list, depending upon the type of calculation used.

Referring now to the remediation routine 350 shown in FIG. 3B, there are illustrated techniques for operating the powertrain 110 when remediation is required as part of the method 300. When the control system 140 recognizes, such as in step 314, that the powertrain 110 is requesting operation at a CVC set that is on the banned list, the remediation routine 350 is called up within the method 300.

Step 360: Begin Remediation.

The remediation routine 350 begins the remediation process by identifying the requested output conditions, including output torque, output speed, and output power. If possible, the remediation routine 350 will prevent the powertrain 110 from operating at banned CVC sets, such as the first CVC set or the second CVC set, while still satisfying the requested output conditions, such that the operator of the vehicle may not perceive a change in performance.

Step 362: Can Input Speed be Altered?

The remediation routine 350 of the method 300 determines whether the input speed to the transmission 114 may be altered without compromising output conditions. Altering the input speed may avoid resonance that is causing the input torque spike, such as the fourth peak event 236.

Step 364: Change Input Speed.

When the remediation routine 350 determines in step 362 that input speed can be altered, the control system changes the input speed of the input shaft 118. The input speed change may be effected by reducing speed or torque commands to the engine 112 or by changing operation of one of the electric machines 116. Note that the input speed change may be negative or positive.

Step 366: Full Performance.

Changing the input speed while still satisfying the output request moves the remediation routine 350 to step 366 and the powertrain 110 operates at a full performance condition. The remediation routine 350 then ends and the method 300 continues repeating and monitoring input torque peaks and banned CVC sets.

Step 368: Can Transmission Mode be Altered?

If the remediation routine 350 cannot alter the input speed without changing output conditions, the remediation routine 350 will next determine whether the operating mode of the transmission 114 can be altered. Altering the mode may allow the powertrain 110 to have both the same output conditions and the same input speed, but not create the input torque peak.

Step 370: Change Operating Mode.

If the input speed cannot be altered but the operating mode can, the remediation routine 350 will use the control system 140 to command a change to the operating mode of the transmission 114. The mode change allows the powertrain 110 to operate at the full performance condition.

Note that changing the input speed and the operating mode are only two illustrative remediation steps that may be included within the remediation routine 350 in order to achieve the full performance condition. Other possible remediation steps include, without limitation: changing the engine torque and changing the displacement on demand state (i.e., deactivating or activating some cylinders of the engine 112). For example, changing the displacement on demand state may have similar effect to changing the input speed, in that both may move the hybrid transmission 114 out of conditions causing resonance.

Step 372: Reduced Performance.

If the remediation routine 350 determines that no changes may be made to the operating of the powertrain 110 while still satisfying the output request, the full performance mode or full performance condition cannot be used while still avoiding the input torque peak. Therefore, in order to avoid possible failures caused by the elevated input torque levels, the remediation routine 350 of the method 300 will place the powertrain 110 in a reduced performance mode.

The reduced performance mode includes limiting the output torque, the output speed, or both, of the output member 122. However, the reduced performance mode takes the powertrain 110 below normal operations and the operator or driver of the vehicle may notice the reduction.

The reduced performance mode enacted by the remediation routine 350 may be temporary, such that the reduction in performance is transient and the powertrain 110 soon returns to normal operation. However, particularly when a large number of CVC sets have been placed on the banned list, the method 300 and the remediation routine 350 may implement a continued reduced performance mode until repairs, services, or alterations are made to the powertrain 110. For example, extended reduced performance mode may include placing caps or maximums on the output torque, output power, or output speed that can be requested by the driver and may include notifying the driver that service is required.

In some extreme cases, the remediation routine 350 may effect a reduced performance mode that completely deactivates or shuts down the powertrain 110 and the vehicle. This may occur when previous operating conditions indicate that any further operation of the powertrain 110 is likely to result in failure of one or more elements or components.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A method of controlling a powertrain having a hybrid transmission between an input member and an output member, wherein an on-board controller executes the method comprising:
    monitoring input torque at the input member;
    monitoring critical vehicle characteristics of the powertrain, wherein critical vehicle characteristics include:
        a transmission operating mode; and
        an input speed of the input member;
    operating the powertrain at the input torque;
    comparing input torque to a minimum threshold;
    identifying a first critical event, wherein critical events occur when the monitored input torque exceeds the minimum threshold;
    identifying a first peak with the on-board controller during the first critical event, wherein peak events occur when the monitored input torque changes between positive slope and negative slope;
    identifying a first critical vehicle characteristic set (first CVC set) occurring substantially concurrently with the first peak; and recording the first CVC set and the first peak in a look-up table accessible to the on-board controller.

2. The method of claim 1, further comprising:
comparing the first peak to a maximum threshold, wherein the maximum threshold is greater than the minimum threshold; and
if the first peak exceeds the maximum threshold, preventing the powertrain from subsequently operating at the first CVC set, such that the first peak is prevented from subsequently occurring.

3. The method of claim 2, further comprising:
identifying a second critical event;
identifying a second peak of the monitored input torque;
identifying a second CVC set occurring substantially concurrently with the second peak;
recording the second CVC set and the second peak in the look-up table; and
if the second peak exceeds the maximum threshold, preventing the powertrain from subsequently operating at the second CVC set, such that the second peak is prevented from subsequently occurring.

4. The method of claim 3, wherein preventing the powertrain from subsequently operating at the first CVC set and the second CVC set occurs through a remediation process, which includes:
altering the input speed of the input member; and
changing the operating mode, if the input speed cannot be altered.

5. The method of claim 4, wherein the remediation process further includes:
placing the powertrain in a reduced performance mode, if the input speed cannot be altered and the operating mode cannot be changed, wherein reduced performance includes limiting an output torque and output speed at the output member below normal operations.

6. The method of claim 3, further comprising:
comparing the magnitude of the first peak and the second peak to a range-differentiated threshold scale, wherein the range-differentiated threshold scale has:
a low range,
a mid range,
a high range, wherein the low range, the mid range, and the high range are respectively ordered between the minimum threshold and the maximum threshold, and
an excess range, which is above the maximum threshold;
recording the first peak and the second peak in the look-up table as one of a low-range count, a mid-range count, a high-range count, and an excess-range count according to the magnitude of the first peak and the second peak within one of the low range, the mid range, the high range, and the excess range.

7. The method of claim 6, further comprising:
comparing the low-range count to an individual low-range limit and, if the low-range count exceeds the individual low-range limit, preventing the powertrain from subsequently operating at any CVC set within the low range, such that the low-range count is prevented from subsequently increasing;
comparing the mid-range count to an individual mid-range limit and, if the mid-range count exceeds the individual mid-range limit, preventing the powertrain from subsequently operating at any CVC set within the mid range, such that the mid-range count is prevented from subsequently increasing; and
comparing the high-range count to an individual high-range limit and, if the high-range count exceeds the individual high-range limit, preventing the powertrain from subsequently operating at any CVC set within the high range, such that the high-range count is prevented from subsequently increasing.

8. The method of claim 7, further comprising:
dividing the low-range count by the individual low-range limit to calculate a low-range ratio;
comparing the low-range ratio to a maximum individual ratio and, if the low-range ratio exceeds the maximum individual ratio, preventing the powertrain from subsequently operating at any CVC set within the low range, such that the low-range count is prevented from subsequently increasing;
dividing the mid-range count by the individual mid-range limit to calculate a mid-range ratio;
comparing the mid-range ratio to the maximum individual ratio and, if the mid-range ratio exceeds the maximum individual ratio, preventing the powertrain from subsequently operating at any CVC set within the mid range, such that the mid-range count is prevented from subsequently increasing;
dividing the high-range count by the individual high-range limit to calculate a high-range ratio; and
comparing the high-range ratio to the maximum individual ratio and, if the high-range ratio exceeds the maximum individual ratio, preventing the powertrain from subsequently operating at any CVC set within the high range, such that the high-range count is prevented from subsequently increasing.

9. A method of controlling a powertrain having a hybrid transmission between an input member and an output member, wherein an on-board controller executes the method comprising:
monitoring input torque at the input member;
monitoring critical vehicle characteristics of the powertrain, wherein critical vehicle characteristics include:
a transmission operating mode; and
an input speed of the input member;
operating the powertrain at the input torque;
determining an average input torque from the monitored input torque;
determining an oscillation torque from the difference between the monitored input torque and from the determined average input torque;
comparing the determined oscillation torque to a fatigue threshold;
identifying a first fatigue event, wherein fatigue events occur when the determined oscillation torque exceeds the fatigue threshold;
identifying a first fatigue peak with the on-board controller during the first critical event, wherein fatigue peaks occur when the determined oscillation torque changes between positive slope and negative slope;
identifying a first critical vehicle characteristic set (first CVC set) occurring substantially concurrently with the first peak; and
recording the first CVC set and the first peak in a look-up table accessible to the on-board controller.

10. The method of claim 9, further comprising:
matching the first fatigue peak to an opposing fatigue peak occurring on the opposing side of the average input torque from the first fatigue peak;
creating a first fatigue pair from the first fatigue peak and the opposing fatigue peak;
comparing the first fatigue pair to a range-differentiated threshold scale, wherein the range-differentiated threshold scale has:
a low range, a mid range, and a high range, wherein the low range, the mid range, and the high range are respectively ordered above the fatigue threshold; and recording the first fatigue peak in the look-up table as one of a low-range count, a mid-range count, and a high-range count according to the location of the first peak and the second peak within one of the low range, the mid range, and the high range.

\* \* \* \* \*